United States Patent [19]

Thiele

[11] Patent Number: 5,776,217
[45] Date of Patent: Jul. 7, 1998

[54] VACUUM RECEIVER

[75] Inventor: Charles W. Thiele, Kalamazoo, Mich.

[73] Assignee: Motan, Inc., Plainwell, Mich.

[21] Appl. No.: 771,919

[22] Filed: Dec. 23, 1996

[51] Int. Cl.⁶ .................................................. B01D 45/04
[52] U.S. Cl. .................... 55/417; 55/435; 55/439;
55/462; 55/DIG. 14
[58] Field of Search ......................... 95/267; 55/417,
55/418, DIG. 14, 465, 462, 439, 435, 415

[56] References Cited

U.S. PATENT DOCUMENTS

| | | | |
|---|---|---|---|
| 866,804 | 9/1907 | Olson | 55/465 |
| 1,211,310 | 1/1917 | Griffin | 55/465 |
| 1,600,762 | 9/1926 | Hawley | 55/465 |
| 2,641,335 | 6/1953 | Berg | 183/106 |
| 4,005,908 | 2/1977 | Freeman | 55/482 |
| 4,083,607 | 4/1978 | Mott | 55/482 |
| 4,306,891 | 12/1981 | Clarke et al. | 55/465 |
| 4,583,885 | 4/1986 | Thiele | 406/168 |
| 5,273,562 | 12/1993 | Sneehan | 55/350.1 |
| 5,340,241 | 8/1994 | Thiele et al. | 406/132 |
| 5,490,745 | 2/1996 | Thiele et al. | 406/132 |

*Primary Examiner*—Duane S. Smith
*Attorney, Agent, or Firm*—Flynn, Thiel, Boutell & Tanis, P.C.

[57] ABSTRACT

A vacuum receiver for use in a pneumatic vacuum conveying system having a lid which gas-tightly closes a particle storage vessel. The lid has two apertures therein allowing a gas-particle stream to enter the interior of the vessel and a gas stream to exit the vessel. An upstanding hollow inlet housing is gas-tightly secured on an exterior surface of the lid communicating with one of the apertures. An inlet port is provided in one side of the inlet housing. The gas-particle stream enters the inlet port with sufficient velocity so that the particles strike the inlet housing opposite the inlet port to decelerate the particles. The particles fall through the one aperture and are stored in the vessel. The gas stream also enters the vessel through the one aperture and exits through the other aperture into an upstanding hollow outlet housing. The gas stream exits the outlet housing via an outlet port in the outlet housing. The outlet port is selectively closable by a plunger with a stopper plate thereon housed within the interior of the outlet housing. When the outlet port is closed, no gas-particle stream enters the vacuum receiver.

4 Claims, 2 Drawing Sheets

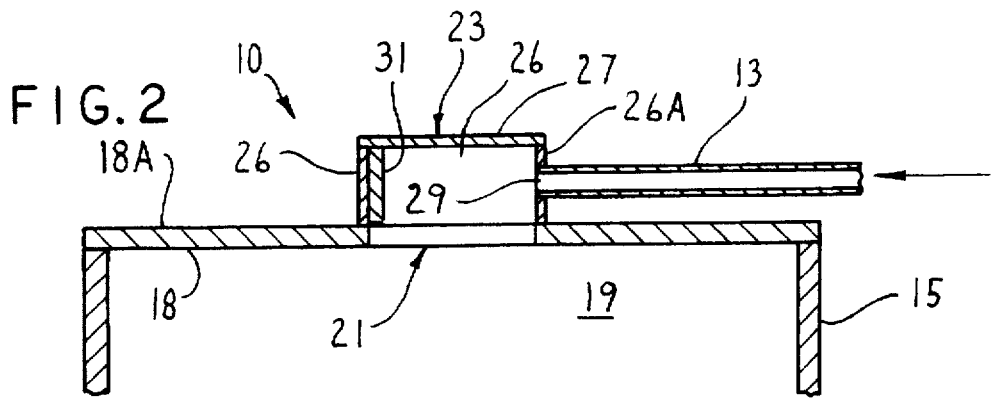
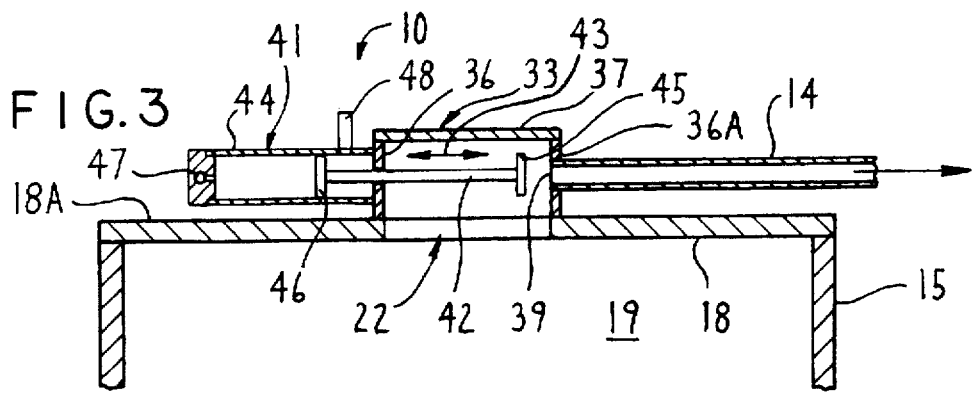
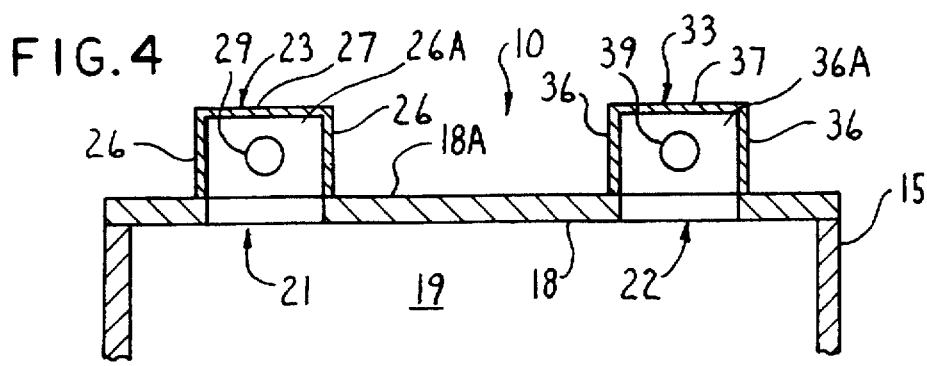
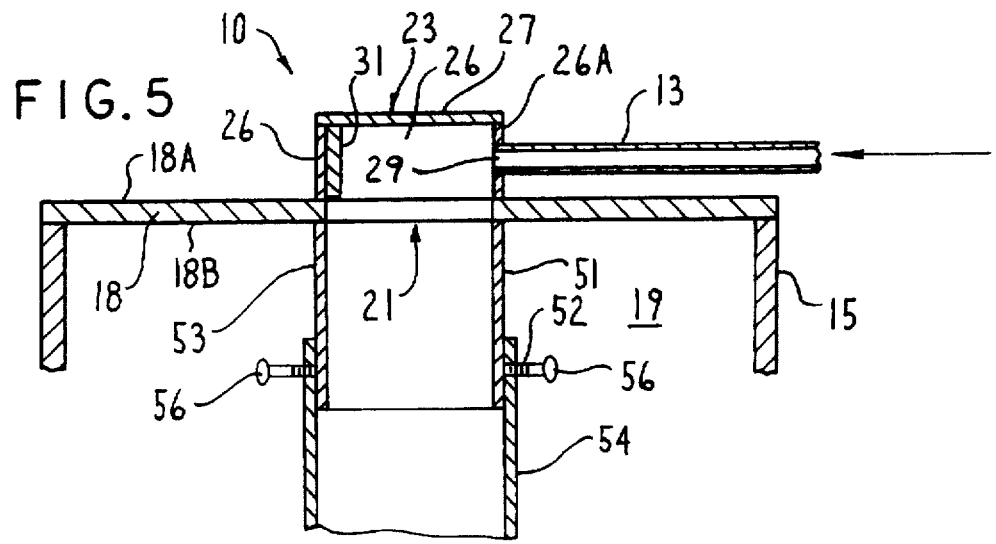

VACUUM RECEIVER

FIELD OF THE INVENTION

This invention relates to a vacuum receiver that separates dry, powdered and granular particulate from an incoming gas-particulate stream without the use of internal filters. More particular, this invention relates to a vacuum receiver of the type wherein dry, powdered and granular particulate is conveyed by a gas stream into the receiver whereat the gas stream is separated from the dry, powdered and granular particulate.

BACKGROUND OF THE INVENTION

In the known vacuum receivers, used in pneumatic conveyor systems, a lid having an inlet for the gas stream entrained with solids is positioned to close off the top of a storage container. The inlet extends through an externally positioned curved elbow piece and thence into the interior of the storage container through a straight sleeve piece. The extension of the inlet into the storage container reduces the volume in the storage container for storing the solids therein. Gas stream outlets, defined by plural sleeves concentric with the aforementioned straight sleeve piece, are positioned on the lid and also extend into the interior of the storage container. These outlets also reduce the volume of the storage container available for storing the solids therein. One such device is disclosed in U.S. Pat. No. 2,641,335.

The extension of the inlet and outlets into the storage container through the lid creates a complex lid structure which causes gas entrained with solids to enter the storage container at the same velocity, and the solids are separated from a gas stream within the storage container. The lid must also be raised high enough above the storage container so that the portions of the inlet and outlets which extend into the interior of the storage container when the lid is positioned thereon clear the upper edge of the storage container.

The conventional inlets and outlets are designed to be used with specific storage containers. The extension of the inlets and outlets into the interior of the storage container require the storage container to have a sufficient height and diameter to allow the inlets and outlets to extend into the interior thereof to allow the separation of the solids from the gas stream to occur in the storage container. The storage container must have sufficient clearance between the stored product and the inlets and outlets to allow the solids to separate from the gas stream between the ends of the inlets and outlets within the storage container while maintaining sufficient space for the stored solids within the storage container. Further, the height of the externally located inlet and outlet pieces is substantial and restrict locations whereat the separators can be used.

Accordingly, it is an object of this invention to provide a vacuum receiver in which there is no extension of the outlet or inlet into the interior of the storage container while still providing adequate separation of the particles from the gas stream.

It is a further object of the invention to provide a vacuum receiver in which the entire separation of the particles from the gas stream takes place outside the storage container.

SUMMARY OF THE INVENTION

In general, the objects and purposes of the invention are met by providing a vacuum receiver for separating particles entrained in a gas-particle stream and for allowing a gas stream to exit from the vacuum receiver while simultaneously storing the separated particles in a particle receiving vessel. The particle receiving vessel has an open top allowing access to the interior thereof which is closed by a lid mountable thereon. First and second apertures extend through the lid. A hollow inlet housing is positioned on the lid so that the interior thereof communicates with the first aperture and the interior of the vessel. One side of the hollow inlet housing has an inlet port for reception of a gas-particle stream. An upstanding wall member is positioned opposite the inlet port in direct alignment with the path of the incoming gas-particle stream. A hollow outlet housing is positioned on the lid so that the interior of the outlet housing communicates with the second aperture and the interior of the vessel. An outlet port is positioned in the outlet housing and provides a path for the gas stream to exit the vacuum receiver. A reciprocal plunger is positioned in the outlet housing opposite the outlet port for selectively closing the outlet port. Other optional features of the invention include an adjustable length sleeve attached to the interior of the lid surrounding the inlet aperture.

BRIEF DESCRIPTION OF THE DRAWINGS

Further objects and purposes of this invention will be apparent to persons acquainted with apparatus of this general type upon reading the following specification and inspecting the accompanying drawings, in which:

FIG. 2 is an enlarged sectional view taken generally along the line 2—2 of FIG. 1;

FIG. 3 is a sectional view taken generally along line 3—3 of FIG. 1;

FIG. 4 is a sectional view taken generally along line 4—4 in FIG. 1; and

FIG. 5 is a view similar to FIG. 2 showing a modification of the vacuum receiver.

DETAILED DESCRIPTION

Figure 1:
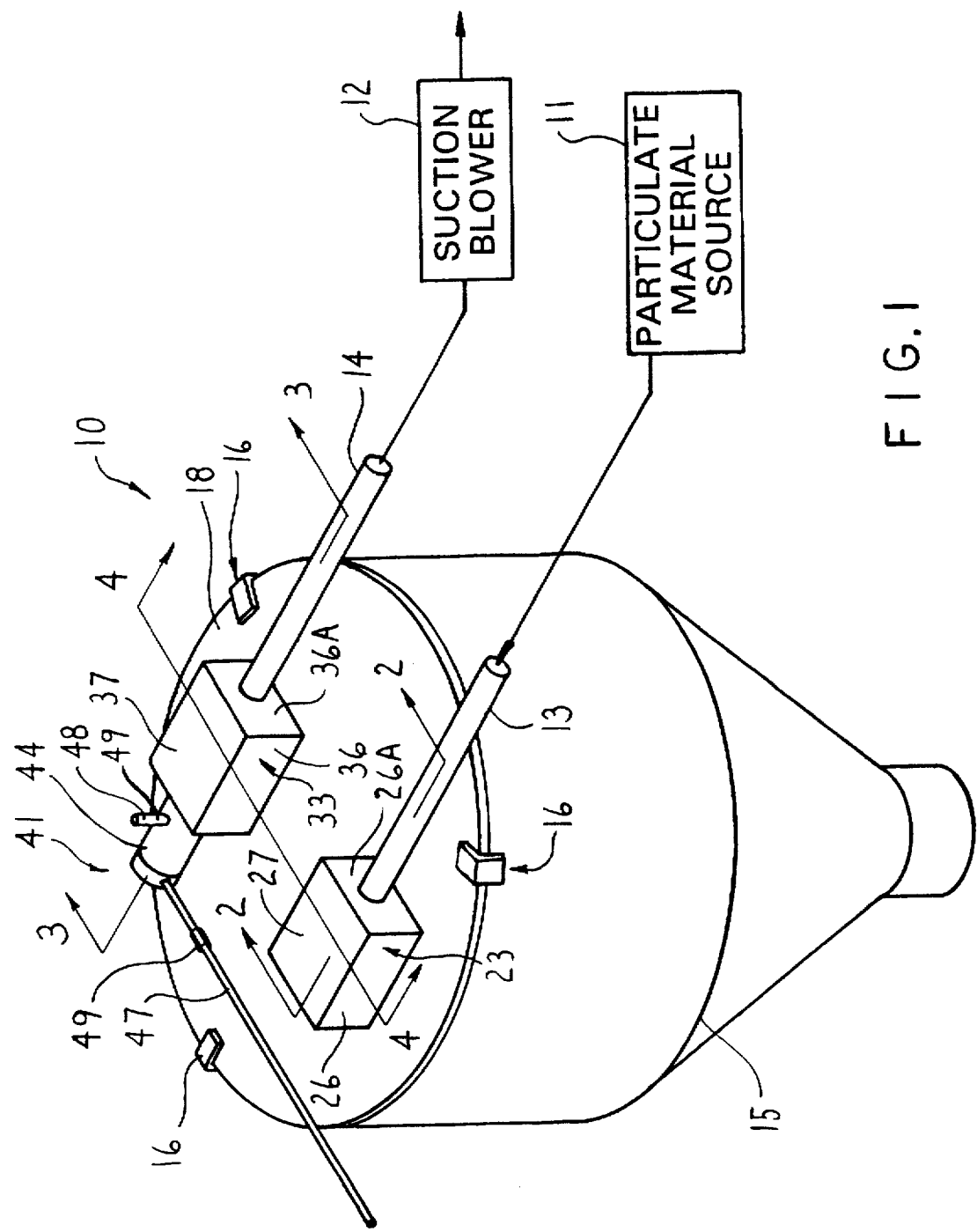
FIG. 1 is an isometric view of the vacuum receiver positioned on a storage hopper.

Certain terminology may be used in the following description for convenience in reference only and will not be limiting. The words "up" and "down" will designate directions in the drawings to which reference is made. The words "in" and "out" will refer to directions toward and away from the designated parts of the device. Such terminology will include the words above specifically mentioned, derivatives thereof and words of similar import.

FIG. 1 illustrates a vacuum receiver 10 adapted to separate a particulate material or particles entrained in a gas-particle stream from a particulate material source 11. The particles are entrained in the gas-particle stream by an exhaust blower means 12 in a pneumatic vacuum conveying system. An example of a pneumatic vacuum conveying system is shown in U.S. Pat. Nos. 4,583,885, 5,340,241 and 5,490,745. U.S. Pat. Nos. 4,583,885, 5,340,241 and 5,490,745 are hereby incorporated by reference. The blower means 12 creates a gas flow within a gas tight gas flow system represented in FIG. 1 by the inlet unit or tube 13, outlet unit or tube 14, and vacuum receiver 10.

The vacuum receiver 10 is positioned on a conventional hollow interior hopper or vessel 15. The hopper or vessel 15 receives the particulate thereby acting as a storage container for the particulate material. The vessel 15 has an open top which is gas tightly closed by a lid 18 mountable thereon. The lid is mountable on the open top of the hopper 15 by conventional means, for example, by a clamp or flange arrangement or the plural releasable latches 16 shown schematically in FIG. 1. The lid 18 has two separate apertures 21, 22 therein allowing fluid communication between the interior 19 of the vessel 15 and the gasparticle pneumatic conveyor system. An exterior surface 18A of the lid 18 faces outwardly or away from the interior 19 of the vessel 15 when closing the open top with the lid. An interior surface 18B of the lid 18 faces inwardly toward the interior 19 of the vessel 15 when closing the open top with the lid.

An upstanding, hollow inlet housing 23 is gas tightly secured to the exterior surface 18A of the lid 18. The interior 24 of the inlet housing 23 is defined by the upstanding wall members 26 and a top wall 27. The top wall 27 is gas tightly attached to the upper edges of the upstanding wall members 26 distal the exterior surface 18A of the lid 18. One of the upstanding wall members 26A has an inlet port 29 bored therethrough. The inlet port 29 is connected to and fluidly and gas-tightly communicates with the interior of the inlet tube 13 for providing communication with the gas-particle pneumatic vacuum conveyor system. An upstanding wall member opposite the inlet port 29 is positioned directly in the path of an incoming gas-particle stream. In a further embodiment, a replaceable wear plate 31 is positioned adjacent and parallel to the upstanding wall member directly opposite the inlet port 29 so that the wear plate 31 is oriented in direct alignment with the path of the incoming gas-particle stream arriving through the inlet port 29. The wear plate is secured in place by any convenient means, as by screws not shown.

An upstanding hollow outlet housing 33 is gas-tightly secured to the exterior surface 18A of lid 18. The interior 34 of the outlet housing 33 is in gas-tight and fluid communication with the aperture 22 through the lid 18. The outlet housing 33 has upstanding wall members 36 and a top wall 37 gas-tightly attached to the upper edges of the upstanding wall members 36 enclosing and defining the interior 34 of the outlet housing 33. An outlet port 39 is positioned in one upstanding wall member 36A of the upstanding wall members 36. The outlet port 39 fluidly communicates with the outlet tube 14 for providing communication with the gas-particle pneumatic vacuum conveyor system. On a side of the upstanding wall member 36 remote from the outlet port 39, a valve housing 41 is provided for effecting a closing of the outlet port 39. More specifically, the valve housing 41 includes therein a reciprocating piston 46 and a plunger 42 connected to the piston 46 and extending through an opening in the wall 36 into the interior 34 of the outlet housing 33. The end of the plunger 42 remote from the piston 46 terminates in a stopper plate 45, which plunger 42 and stopper plate 45 move in the direction of arrow 43 (FIG. 3) so that the stopper plate 45 will selectively open or close the outlet port 39 to stop the flow of the gas stream through the outlet port 39 and thus stop the gas-particle air stream from entering the vacuum receiver 10. The vacuum in the outlet tube 14 assists in gas tightly sealing the stopper plate 45 to the outlet port 39 due to the reduced pressure in the outlet tube 14 relative to the interior of the outlet housing 33 when the outlet port 39 is closed. The valve housing 41 is a pneumatic cylinder 44 with a gas driven piston 46 positioned therein drivable by supplying pressurized gas through a selected one gas inlet 47 or 48 from a remote pressurized gas supply (not shown). In the alternative, the gas inlets 47, 48 may be connected to the suction blower 12 to operate the cylinder-piston 44, 47 arrangement by providing a vacuum on a select side of the piston 47 in the cylinder 44. Valves 49 prevent air flow into or out of the cylinder 44 through gas inlets 47, 48 to hold the piston 46 and hence the plunger 42 and stopper plate 45 in a select position with the outlet port 39 being open or closed. The valves 49 are shown schematically in FIGS. 1 and 3 and may be located at different positions as long as they stop the flow of gas into or out of the cylinder 44.

FIG. 5 shows a modified vacuum receiver 10 with an inlet cylindrical sleeve 51 fixedly secured as by welding to and extending from an interior surface 18B of the lid 18 into the interior 19 of the vessel 15. A further cylindrical sleeve 54 is reciprocally telescoped over a distal end of the sleeve 51. The sleeve 51 has an adjustable means 52 for facilitating an adjusting of the longitudinal length of the inlet sleeve 51 and further sleeve 54 extending into the vessel 15. The adjustable means 52 is shown simply as plural set screws or bolts 56 received within an internally threaded hole in the sleeve 54. One end of the bolt presses against an exterior surface 53 of the inlet sleeve 51 to secure the adjustable sleeve 54 in a select position along the longitudinal length of the fixed sleeve 51.

OPERATION

In operation of a vacuum receiver 10, the plunger 42 and stopper plate 45 is retracted away from the outlet port 39 in response to the supply of pressurized gas through valve 49 associated with the inlet 48 of the pneumatic cylinder 44 and the connection of the port 47 to an exhaust. Thus, the exhaust blower means 12 creates a gas flow in the pneumatic vacuum conveyor system which flows through the vacuum receiver 10. The particulate material in the material source 11 is entrained in a well known manner (see U.S. Pat. Nos. 5,340,241 and 5,490,745) in a gas-particle stream and flows through the inlet tube 13.

The gas-particle stream enters the inlet housing 23 through the inlet port 29. The gas-particle stream has a sufficient velocity to contact the wear plate 31 on the upright wall member 26 opposite the inlet port 29. The particles contacting the wear plate 31 causes a difference in velocity between the particle and the gas stream, meaning the particle is decelerated relative to the gas stream. The gas stream continues at a constant velocity, whereas the particles, due to contact with the wear plate 31, have a reduced velocity which separates the particles from the gas stream. The particles then fall through the aperture 21 into the interior 19 of the vessel 15 and are stored therein. The gas stream continues at its constant velocity into the interior 19 of the vessel 15 through the aperture 21 in the lid 18.

The suction blower means 12 evacuates the gas out of the interior 19 of the vessel 15 through the aperture 22 into the interior of the outlet housing 33 and thence through the outlet port 39 and the outlet tube 14.

When it is desired to stop the flow of particles into the vessel 15, the port 47 of the pneumatic cylinder 44 receives pressurized gas from a pressurized gas source while the port 48 is connected to exhaust to drive the piston 46 toward the wall 36A of the outlet housing 33. This forces the plunger 42 and the stopper plate 45 thereon toward and into sealed engagement without covering the outlet port 39 to seal the interior of the outlet housing 33 from the vacuum gas pressure in the outlet tube 14 created by the exhaust blower means 12 thereby stopping the flow of gas in the pneumatic blower system from travelling through the vacuum receiver 10. When the stopper plate 45 on the plunger 42 seals the outlet port 39, the flow of the gas-particle stream from the material source 11 to vacuum receiver 10 is stopped. The valve 49 in gas inlet 47 is closed so that the gas pressure against the piston 47, the left side in FIG. 3, holds the piston, plunger and stopper plate arrangement 46, 42, 45 in place so that the outlet port 39 is closed.

In the alternative to stop the flow of particles into the vessel 15, the port 47 of pneumatic cylinder 44 is opened and the port 48 of pneumatic cylinder 44 is connected to the suction blower means 12 which drives the stopper plate 45 on the plunger 42 into sealing engagement of the outlet port 39. The suction blower means 12 can also be used to open the outlet port 39 and allow particles to flow into vessel 15. Here the port 47 of the pneumatic cylinder 44 is connected to the suction blower 12 and the port 48 of pneumatic cylinder 44 is open so as to draw the stopper plate 45 from outlet port 39 by drawing the piston 46 toward port 47 (leftwardly in FIG. 3).

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a vacuum receiver for separating particles entrained in a gas-particle stream and for allowing a gas stream to exit from the vacuum receiver to an exhaust blower means while simultaneously allowing the particles to remain in a particle receiving vessel having an open top, the improvement comprising:

a lid mountable on said particle receiving vessel for gas-tightly closing said open top of said particle receiving vessel, said lid having an exterior surface facing away from said vessel when said lid is positioned thereon, an interior surface facing into said vessel when said lid is positioned thereon, and first and second apertures extending through said lid;

an upstanding hollow inlet housing extending outwardly from said exterior surface of said lid and enclosing a first interior space immediately adjacent and communicating with said first aperture and an interior of said vessel, said hollow inlet housing having means defining a first upstanding wall member and a top wall connected to a top edge of said first upstanding wall member so as to gas-tightly enclose and define said first interior space of said hollow inlet housing, a first side of said first upstanding wall member of said hollow inlet housing having an inlet port adapted for connection to and for reception of said gas-particle stream, a second side of said first upstanding wall member of said hollow inlet housing being oriented directly opposite said first side of said first upstanding wall member thereon and in direct alignment with the path of said gas-particle stream; and an upstanding hollow outlet housing extending outwardly from said exterior surface of said lid and enclosing a second interior space immediately adjacent and communicating with said second aperture and an interior of said vessel, said hollow outlet housing having a second upstanding wall member and a top wall connected on a top edge of said second upstanding wall member so as to gas-tightly enclose and define said second interior space of said hollow outlet housing, a first side of said second upstanding wall member of said hollow outlet housing having an outlet port therein adapted for connection to said exhaust blower means in order to facilitate the exit of said gas stream from said gas-particle separator, a second side of said second upstanding wall member of said hollow outlet housing being oriented directly opposite said first side of said second upstanding wall member of said hollow outlet housing having a valve housing with a reciprocal plunger extending therefrom, said plunger having stopper means thereon for selectively closing said outlet port so as to stop said gas stream from flowing through said outlet port;

whereby particles entrained in said gas stream and drawn into the interior of said hollow inlet housing, in response to said outlet port being open to said exhaust blower means, will strike said second side of said first upstanding wall member of said hollow inlet housing and be sufficiently decelerated so as to be separated from said gas stream and allowed to move through said first aperture and be collected in said particle receiving vessel.

2. The vacuum gas-particle separator according to claim 1, further comprising an adjustable sleeve extending inwardly of said vessel from said interior surface of said lid communicating with said first aperture extending through said lid.

3. The vacuum gas-particle separator according to claim 1, wherein said valve housing with said reciprocal plunger is a pneumatic cylinder with an inlet port at both ends thereof, and a piston on an end of said reciprocal plunger within said cylinder being movable within said cylinder to move said reciprocal plunger and said stopper means thereon to selectively close said outlet port.

4. The vacuum gas-particle separator according to claim 1, wherein said second side of said first upstanding wall member includes a wear plate replaceably secured thereto directly in the path of said gas-particle stream.

* * * * *